United States Patent [19]
Nichols

[11] Patent Number: 6,104,339
[45] Date of Patent: Aug. 15, 2000

[54] ALL-TERRAIN ERROR CORRECTION

[75] Inventor: Mark Edward Nichols, Sunnyvale, Calif.

[73] Assignee: Trimble Navigation Limited, Sunnyvale, Calif.

[21] Appl. No.: 09/136,813

[22] Filed: Aug. 19, 1998

[51] Int. Cl.$^7$ .............................. G01S 5/02; H04B 7/185; G05I 3/02

[52] U.S. Cl. ................................ 342/357.06; 342/357.08; 342/357.13; 342/457; 701/205

[58] Field of Search ......................... 342/357.06, 357.17, 342/357.13, 357.08, 457; 701/205

[56] References Cited

U.S. PATENT DOCUMENTS 5,867,404  2/1999  Bryan ........................................ 342/457

*Primary Examiner*—Thomas H. Tarcza
*Assistant Examiner*—Fred Mull
*Attorney, Agent, or Firm*—Boris G. Tankhilevich

[57] ABSTRACT

The real time differential satellite navigational system integrated with the tilt measurement system is disclosed. The integrated positioning system allows one to perform the real time precise navigation of a mobile unit in a variable tilt environment. In another embodiment, the map generating system is disclosed. The map generating system utilizes the low cost post-processing differential GPS receiver. The map generating system allows one to record the map of an actual area covered by a mobile unit in a variable tilt environment.

19 Claims, 2 Drawing Sheets

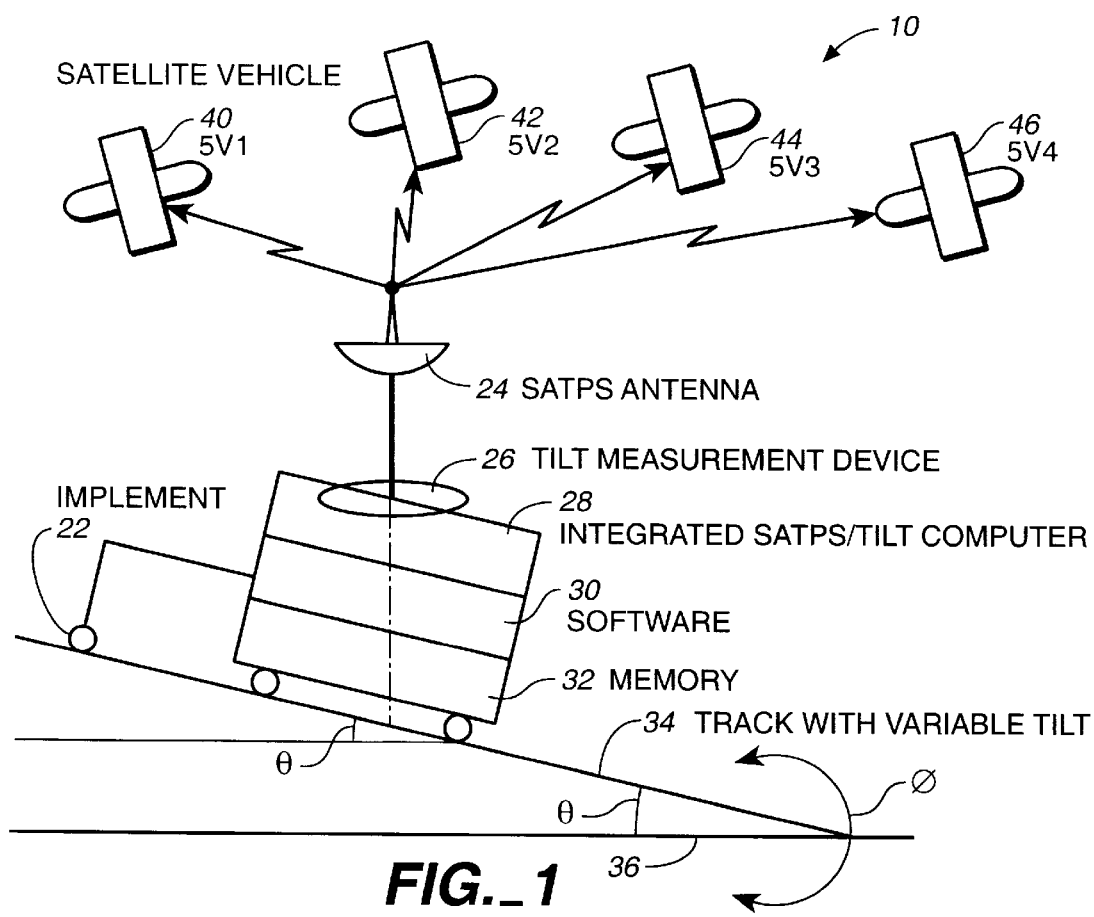
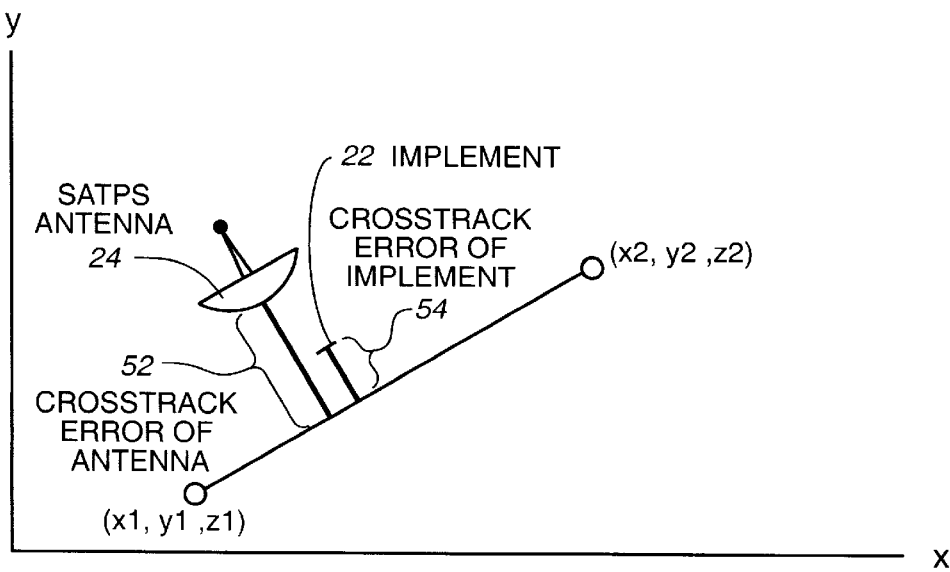

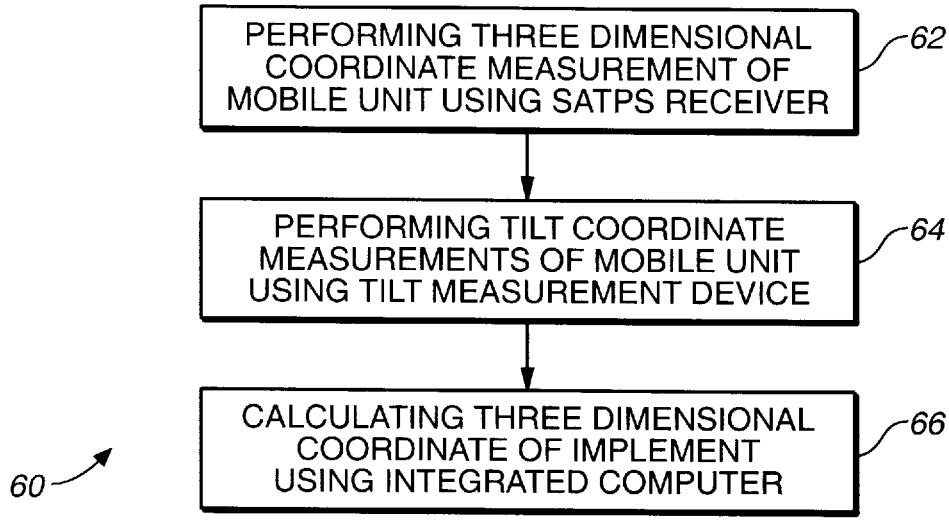
FIG._3
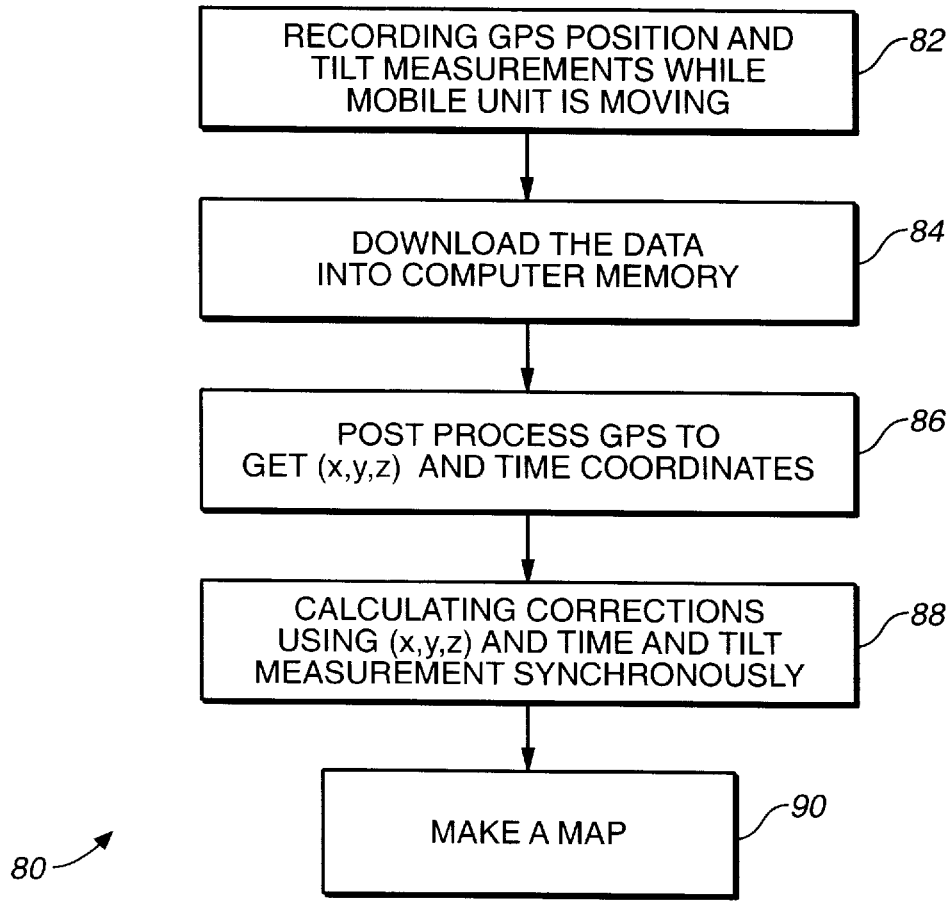
FIG._4

ALL-TERRAIN ERROR CORRECTION

BACKGROUND

Let us consider a mobile unit that moves along a track with a variable tilt. As an example, one can envision a farm tractor towing an implement, like a spray unit, in a field.

If the mobile unit equipped with a satellite navigational system (for example, GPS) moves along a track with variable tilt, the GPS feeds positions into the guidance system. As the mobile unit travels the rough terrain, crosstrack error is introduced into the guidance system, because when the GPS is out of track, the mobile unit itself is on the track with variable tilt.

Thus, the actual coordinates of the mobile unit is difficult to determine using only the satellite navigational system without knowledge of the crosstrack error.

What is needed is a satellite navigational system integrated with a tilt measurement system that is capable of precise measurement of the coordinates of the mobile unit that moves along a variable tilt track.

SUMMARY

The current patent application is unique because it discloses a satellite navigational system integrated with a tilt measurement system that is capable of precise measurement of the actual coordinates of the mobile unit that moves along a track with variable tilt.

One aspect of the present invention is directed to a real time positioning system comprising: (1) a satellite positioning system (SATPS) receiver mounted in a housing means of a mobile unit; and (2) a tilt angle measurement device integrated with the SATPS receiver. The SATPS receiver is configured to perform three dimensional coordinates measurements of the mobile unit, and the tilt measurement device is configured to perform tilt coordinates measurements of the mobile unit.

In one embodiment, the system further comprises a SATPS/tilt integrated navigational computer configured to calculate three dimensional coordinates of an implement mounted in the mobile unit by solving a set of geometrical equations including the three dimensional coordinates of the mobile unit, the tilt coordinates of the mobile unit that are measured synchronously with the three dimensional coordinates of the mobile unit, and a distance between the SATPS receiver and the implement.

The SATPS receiver can comprise: an RTK differential GPS receiver, a differential GPS receiver, a GLONASS receiver, or a combined GPS/GLONASS receiver.

The tilt angle measurement device can comprise: an electronic tilt measurement device.

The electronic tilt measurement device can comprise a single angle measurement device or a dual angle measurement device.

In one embodiment, the mobile unit further comprises a farm tractor towing a spray unit.

Another aspect of the present invention is directed to a map generating system.

In one embodiment, the map generating system comprises: (1) a satellite positioning system (SATPS) receiver mounted in a housing means of a mobile unit; (2) a tilt angle measurement device integrated with the SATPS receiver; (3) a SATPS/tilt integrated navigational computer; and (4) a memory unit.

In one embodiment, the SATPS receiver is configured to perform three dimensional coordinates measurements of the mobile unit, the tilt measurement device is configured to perform tilt coordinates measurements of the mobile unit, and the SATPS/tilt integrated navigational computer is configured to calculate three dimensional coordinates of an implement mounted in the mobile unit. The memory unit is configured to record three dimensional coordinates of the implement in order to generate a map of an actual area covered by the implement.

In one embodiment of the map generating system, the (SATPS) receiver further comprises a differential GPS post-processing receiver, the mobile unit further comprises a farm tractor towing a spray unit, and the map generating system generates a map of an actually sprayed area of an agricultural field with variable tilt.

One more aspect of the present invention is directed to a method of coordinate measurement comprising the steps of: (1) performing three dimensional coordinates measurements of a mobile unit by using a satellite positioning system (SATPS) receiver mounted in a housing means of the mobile unit; (2) performing tilt coordinates measurements of the mobile unit by using a tilt angle measurement device integrated with the SATPS receiver; and (3) calculating three dimensional coordinates of an implement mounted in the mobile unit by utilizing the three dimensional coordinates and the tilt coordinates of the mobile unit.

Yet, one additional aspect of the present invention is directed to a method for generating a map.

In one embodiment, the method comprises the steps of: (1) performing three dimensional coordinates measurements of a mobile unit by using a satellite positioning system (SATPS) receiver mounted in a housing means of the mobile unit; (2) performing tilt coordinates measurements of the mobile unit synchronously with the three dimensional coordinates measurements of the mobile unit by using a tilt angle measurement device integrated with the SATPS receiver; (3) calculating three dimensional coordinates of an implement mounted in the mobile unit by using a SATPS/tilt integrated navigational computer; (4) recording three dimensional coordinates of the implement by using a memory unit of the SATPS/tilt integrated navigational computer; and (5) generating a map of an actual area covered by the implement by using a map software.

BRIEF DESCRIPTION OF DRAWINGS

FIG. 1 depicts a real time positioning system of the present invention.

FIG. 2 shows a crosstrack error.

FIG. 3 is a flow chart of the method of real time coordinate measurement of the present invention.

FIG. 4 depicts additional steps for a method of generating a map of actual area covered by the implement.

FULL DESCRIPTION OF THE PREFERRED EMBODIMENTS

FIG. 1 shows a positioning system (10) of the present invention that is capable of precise measurement of actual coordinates of a mobile unit that moves along a track with variable tilt.

In one embodiment, the positioning system (10) comprises a satellite positioning system (SATPS) receiver. The SATPS receiver including a SATPS antenna (24) is mounted in a housing means of the mobile unit (20). The positioning system (10) additionally includes a tilt angle measurement device (26) integrated with the SATPS receiver.

The SATPS receiver is configured to perform three dimensional coordinates measurements of the mobile unit.

The tilt measurement device (26) is configured to perform tilt coordinates measurements of the mobile unit (20) that moves along a track (34) with variable tilt. The three dimensional coordinates and the tilt coordinates of the mobile unit are utilized by an integrated SATPS/tilt navigational computer (28) to calculate in real time three dimensional coordinates of an implement (22) mounted in the mobile unit (20). Thus, the crosstrack error (52 of FIG. 2) of the SATPS antenna (24) and the crosstrack error of the implement itself (54 of FIG. 2) are eliminated.

There are several well known satellite positioning systems (SATPS). In one embodiment, the satellite based navigational system comprises the GPS (global positioning system).

The GPS is a system of satellite signal transmitters, with receivers located on the Earth's surface or adjacent to the Earth's surface, that transmits information from which an observer's present location and/or the time of observation can be determined.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite continuously transmits two spread spectrum, L-band carrier signals: an L1 signal having a frequency $f1=1575.42$ MHz (nineteen centimeter carrier wavelength) and an L2 signal having a frequency $f2=1227.6$ MHz (twenty-four centimeter carrier wavelength). These two frequencies are integral multiplies $f1=154\ f0$ and $f2=120\ f0$ of a base frequency $f0=10.23$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of $10\ f0=10.23$ MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=10.23$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, N.Y., 1992, pp. 17–90.

In another embodiment, the SATPS system comprises a Global Navigational System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where k $(=1,2,\ldots 24)$ is the channel or satellite number. These frequencies lie in two bands at 1.597–1.617 GHz (L1) and 1,240–1,260 GHz (L2). The L1 code is modulated by a C/A- code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

A satellite positioning system (SATPS), such as the GPS, the GLONASS, or the combination of GPS and GLONASS systems uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range $R_i$ to the satellite but only the pseudo-range ($r_i$) to each SATPS satellite.

After the SATPS receiver determines the coordinates of the i-th SATPS satellite by picking up transmitted ephemeris constants, the SATPS receiver can obtain the solution of the set of the four equations for its unknown coordinates ($x_0$, $y_0$, $z_0$) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187). The following discussion is focused on a GPS receiver, though the same approach can be used for a GLONASS receiver, for a GPS/GLONASS combined receiver, or any other SATPS receiver.

Thus, the SATPS receiver of FIG. 1 can comprise: (a) a GPS receiver, (b) a GLONASS receiver; or (c) a combined GPS/GLONASS receiver.

In one embodiment, when the accuracy of the mobile unit position measurement is not important, the GPS receiver of FIG. 1 can comprise an autonomous GPS receiver that can be implemented using a single frequency Ag 132 GPS TRIMBLE receiver. The autonomous receiver utilizes the absolute positioning method to obtain its position with an accuracy of 10–100 meters.

In another embodiment, when the accuracy of the mobile unit position measurement is important, the GPS receiver of FIG. 1 can comprise a differential GPS receiver.

In this embodiment, a configuration of two or more receivers can be used to accurately determine the relative positions between the receivers or stations. In differential position determination, many of the errors in the GPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms.

In the real time embodiment of the present invention, the differential GPS receiver can include: (a) a real time code differential GPS, or (b) a real-time kinematic (RTK) differential GPS that includes a code and carrier RTK differential GPS receiver.

The differential GPS receiver can obtain the differential corrections from different sources.

In one embodiment, the differential GPS receiver can obtain the differential corrections from a Reference (Base) Station. The fixed Base Station (BS) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the base station location and the base station clock. With a proper equipment, a relative accuracy of <1 meter should be possible at distances of a few hundred kilometers from the Base Station.

In another embodiment, the differential GPS receiver can be implemented using a TRIMBLE Ag GPS-132 receiver that obtains the differential corrections from the U.S. Cost Guard service free in 300 kHz band broadcast. The accuracy of this differential GPS method is about 50 cm.

In one more embodiment, the differential corrections can be obtained from the Wide Area Augmentation System (WAAS). The WAAS system includes a network of Base Stations that uses satellites (initially geostationary satellites-GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm.

The WAAS provides the differential corrections free of charge to a WAAS-compatible user. The accuracy of this method is less than 1 meter.

In one more embodiment, three satellite commercial services that broadcast the differential corrections can be used: (1) Omnistar, (2) Racal, (3) Satloc, and (4) the satellite system operated by the Canadian Government. The accuracy of this method is (10–50) cm.

In one more embodiment, the real time kinematic (RTK) differential GPS receiver can be used to obtain the position locations with less than 2 cm accuracy. The RTK differential GPS receiver receives the differential corrections from a Base Station placed in a know location within (10–50) km from the local user.

For the high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19 (or 24) centimeters, which is an unacceptable error for the centimeter-level accuracy measurements.

Referring back to FIG. 1, positioning system (10) further includes a tilt angle measurement device (26).

In one embodiment, the tilt angle measurement device (26) further comprises an electronic tilt measurement device.

The Precision Navigation, Inc., (PNI) based in Mountain View, Calif. manufactures TCM2 Electronic Compass Sensor Module. TCM2 is a high-performance, low-power electronic compass sensor that offers compass heading, pitch and roll through an electronic interface to host system. This high end system provides a robust heading reference system that can be easily integrated with a GPS navigational system.

The Precision Navigation, Inc., (PNI) also manufactures a low end, low cost Vector-VR Head Positioning Sensor that provides a 3 DOF attitude sensor whose combination of tilt-performance, low-power, and low-cost makes it ideally suited for tilt-measurement applications.

In one embodiment, the tilt measurement device (26 of FIG. 1) can comprise a single angle measurement device that can determine the heading of the mobile unit if the relationship between the single angle coordinate and the direction of the movement of the mobile unit is known. In this embodiment, the single tilt angle can comprise a pitch angle only or a roll angle only.

In another embodiment, the tilt measurement device (26 of FIG. 1) can comprise a dual angle measurement device that can determine the heading of the mobile unit if the relationship between the dual angle coordinates and the direction of the movement of the mobile unit is known. In this embodiment, the dual tilt angles can comprise a combination of pitch and roll angles.

In one embodiment, the heading of the mobile unit can be determined by obtaining a first set of three dimensional coordinates of the GPS receiver at a first location of the mobile unit, obtaining a second set of three dimensional coordinates of the GPS receiver at a second location of the mobile unit, and computing the heading of the GPS receiver by utilizing the first set of three dimensional coordinates measurements at the first second location of the mobile unit and the second set of three dimensional coordinates measurements at the second location of the mobile unit.

In another embodiment, the heading of the GPS receiver can be determined by utilizing a standard magnetic compass.

Referring back to FIG. 1, the system (10) further includes a GPS/tilt integrated navigational computer (28) configured to calculate three dimensional coordinates of the mobile unit.

In one embodiment, the mobile unit further comprises a farm tractor towing an implement (22 of FIG. 1), wherein the implement further comprises a spray unit.

For instance, Ag-Chem Equipment Co., Inc, based in Minnetonka, Minn. manufactures the Terra-Gator that allows a farmer to perform precision farming.

In this embodiment, the Terra-Gator equipped with the positioning system (10 of FIG. 1) includes the GPS/tilt integrated navigational computer (28) that can calculate three dimensional coordinates of the implement (22) by solving a set of geometrical equations including the three dimensional coordinates of the mobile unit, the tilt coordinates of the mobile unit that are measured synchronously with the three dimensional coordinates of the mobile unit, and a distance between the GPS antenna (24) and the implement (22).

Thus, the positioning system (10 of FIG. 1) can perform the precision guidance of the implement (22 of FIG. 1) by compensating for the crosstrack error of implement (54 of FIG. 2) in a variable tilt terrain (like a field).

FIG. 3 depicts the flow chart (60) of a method of coordinate measurement using the positioning system (10 of FIG. 1).

The method of FIG. 3 comprises the following steps. At first, three dimensional coordinates measurements of the mobile unit are performed by using the GPS receiver mounted in a housing means of the mobile unit (step 62 of FIG. 3). In the next step (step 64 of FIG. 3), tilt coordinates measurements of the mobile unit are performed by using the tilt angle measurement device integrated with the GPS receiver. Finally (step 66 of FIG. 3), three dimensional coordinates of an implement mounted in the mobile unit are calculated by utilizing the three dimensional coordinates and the tilt coordinates of the mobile unit.

The step of performing tilt coordinates measurements further comprises the step of determining the relationship between tilt coordinates and the heading of the mobile unit.

In one embodiment, the step of performing tilt coordinates measurements of the mobile unit includes the step of synchronizing the tilt coordinates measurements with a GPS clock, so that both the tilt coordinates measurements and the three dimensional coordinates of the mobile unit can be measured at the same time.

The actual three dimensional coordinates of the implement can be obtained by solving a set of geometrical equations using the GPS/tilt integrated navigational computer (28 of FIG. 1).

The set of equations (1–3) that connects the three dimensional coordinates of the mobile unit (X1, Y1, Z1), the tilt coordinates ($\theta$) (36 of FIG. 1) and ($\Phi$) (35 of FIG. 1) of the mobile unit, and the distance R between the GPS receiver and the implement coordinates (X2, Y2, Z2), is as follows:

$$X2 = X1 + R\,\sin(\Phi)\sin(\theta); \quad (1)$$

$$Y2 = Y1 + R\,\cos(\Phi)\sin(\theta); \quad (2)$$

$$Z2 = Z1 + R\,\cos(\theta). \quad (3)$$

The GPS/tilt integrated positioning system (10 of FIG. 1) allows one to lower the cost of manufacturing the positioning system by using a single integrated unit instead of combing two independent navigational systems: a satellite navigational system and a tilt measurement system. The GPS/tilt integrated positioning system (10 of FIG. 1) ensures the user that the tilt measurements and the mobile unit coordinates measurements are made synchronously and in real time.

However, the cost of purchasing the differential corrections can be substantial, about $1,000 per year. Also, the cost of the high end, real time differential GPS receiver may be very substantial.

To lower the cost of the system (10) of FIG. 1, the user, instead of performing real time measurements of the implement moving in a variable tilt environment, can obtain a map of the actual area covered by the implement. In this embodiment, the lower cost post-processing GPS differential receiver can be used and the need of purchasing the real-time differential corrections can be eliminated.

Thus, in another embodiment of the present invention, a map generating system (10 of FIG. 1) comprises: a post-processing differential GPS receiver (24) mounted in a housing means of a mobile unit, a tilt angle measurement device (26) integrated with the GPS receiver, a GPS/tilt integrated navigational computer (28), and a memory unit (32) configured to record three dimensional coordinates of the implement in order to generate a map of an actual area covered by the implement (22 of FIG. 1).

In one embodiment, a flow chart (60 of FIG. 3) illustrates the real time method of operation of system (10 of FIG. 1).

In the first step (62), the three dimensional coordinates measurements of a mobile unit are performed by using a low cost post-processing GPS receiver mounted in a housing means of the mobile unit. In the next step (64 of FIG. 3), the tilt coordinates measurements of the mobile unit are performed synchronously with the three dimensional coordinates measurements of the mobile unit by using the tilt angle measurement device integrated with the post-processing differential GPS receiver. In the next step (66 of FIG. 3), the three dimensional coordinates of the implement mounted in the mobile unit are calculated by solving a set of geometrical equations including the three dimensional coordinates of the mobile unit, the tilt coordinates of the mobile unit, and a distance between the GPS antenna and the implement by using a GPS/tilt integrated navigational computer.

In one embodiment, the post-processing mode of operation of the system (10 of FIG. 1) is depicted in the flow chart (80) of FIG. 4.

In the step (82), the GPS positions and tilt measurements of the mobile unit are recorded by using a memory unit of the GPS/tilt integrated navigational computer while the mobile unit is moving along the filed. In the step (84) the data recorded in the step (82) is downloaded into computer memory. In the step (86) the recorded data is post processed to get positions and time coordinates. In the step (88) the crosstrack corrections are calculated using the post processed position and time coordinates. Finally, in the step (90 of FIG. 4) a map of an actual area covered by the implement is generated by using a map generating software.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A positioning system comprising:
   a satellite positioning system (SATPS) receiver fixed to a mobile unit; wherein said SATPS receiver is configured to perform three dimensional coordinates measurements of said mobile unit; and
   a tilt angle measurement device integrated with said SATPS receiver; wherein said tilt measurement device is configured to perform tilt coordinates measurements of said mobile unit;
   wherein said three dimensional coordinates and said tilt coordinates of said mobile unit are utilized to calculate real time three dimensional coordinates of an implement mounted in said mobile unit.

2. The system of claim 1 further comprising:
   a SATPS/tilt integrated navigational computer;
   wherein said SATPS/tilt integrated navigational computer is configured to calculate three dimensional coordinates of said implement by solving a set of geometrical equations including said three dimensional coordinates of said mobile unit, said tilt coordinates of said mobile unit that are measured synchronously with said three dimensional coordinates of said mobile unit, and a distance between said SATPS receiver and said implement.

3. The system of claim 1, wherein said SATPS receiver further comprises:
   an RTK differential GPS receiver.

4. The system of claim 1, wherein said SATPS receiver further comprises:
   a differential GPS receiver.

5. The system of claim 1, wherein said SATPS receiver further comprises:
   a GLONASS receiver.

6. The system of claim 1, wherein said SATPS receiver further comprises:
   a combined GPS/GLONASS receiver.

7. The system of claim 1, wherein said tilt angle measurement device further comprises:
   an electronic tilt measurement device.

8. The system of claim 7, wherein said electronic tilt measurement device further comprises:
   a single angle measurement device; and wherein the relationship between said single angle coordinate and the heading of said mobile unit is known.

9. The system of claim 7, wherein said electronic tilt measurement device further comprises:
   a dual angle measurement device; and wherein the relationship between said dual angle coordinates and the heading of said mobile unit is known.

10. The system of claim 1, wherein said mobile unit further comprises:
    a farm tractor towing an implement; and wherein said implement further comprises:
    a spray unit.

11. A map generating system comprising:
    a satellite positioning system (SATPS) receiver mounted in a housing means of a mobile unit, wherein said SATPS receiver is configured to perform three dimensional coordinates measurements of said mobile unit;
    a tilt angle measurement device integrated with said SATPS receiver, wherein said tilt measurement device is configured to perform tilt coordinates measurements of said mobile unit;
    a SATPS/tilt integrated navigational computer, wherein said SATPS/tilt integrated navigational computer is configured to calculate three dimensional coordinates of an implement mounted in said mobile unit by solving a set of geometrical equations including said three dimensional coordinates of said mobile unit, said tilt coordinates of said mobile unit that are measured synchronously with said three dimensional coordinates of said mobile unit, and a distance between said SATPS receiver and said implement; and
    a memory unit configured to record three dimensional coordinates of said implement in order to generate a map of an actual area covered by said implement.

12. The system of claim 11;
    wherein said (SATPS) receiver further comprises:
    a differential GPS post-processing receiver;
    and wherein said mobile unit further comprises:
    a farm tractor towing an implement;
    and wherein said implement further comprises:
    a spray unit;
    and wherein said map generating system generates a map of an actually sprayed area of a field with variable tilt.

13. A method of coordinate measurement comprising the steps of:
    performing three dimensional coordinates measurements of a mobile unit by using a satellite positioning system (SATPS) receiver mounted in a housing means of said mobile unit;
    performing tilt coordinates measurements of said mobile unit by using a tilt angle measurement device integrated with said SATPS receiver; and
    calculating three dimensional coordinates of an implement mounted in said mobile unit by utilizing said three dimensional coordinates and said tilt coordinates of said mobile unit.

14. The method of claim 13; wherein said step of performing tilt coordinates measurements of said mobile unit further comprises the step of:
    synchronizing the tilt coordinates measurements with a SATPS clock.

15. The method of claim 14; wherein said step of calculating three dimensional coordinates of said implement further comprises the step of:

solving a set of geometrical equations including said three dimensional coordinates of said mobile unit, said tilt coordinates of said mobile unit, and a distance between said SATPS receiver and said implement by using a SATPS/tilt integrated navigational computer.

16. The method of claim 13, wherein said step of performing tilt coordinates measurements further comprises the step of:

determining the relationship between tilt coordinates and the heading of said mobile unit.

17. The method of claim 16, wherein said step of determining the relationship between tilt coordinates and the heading of said mobile unit further comprises the steps of:

obtaining a first set of three dimensional coordinates of said SATPS receiver at a first location of said mobile unit;

obtaining a second set of three dimensional coordinates of said SATPS receiver at a second location of said mobile unit; and computing the heading of said SATPS receiver by utilizing said first set of three dimensional coordinates measurements and said second set of three dimensional coordinates measurements.

18. The method of claim 16, wherein said step of determining the relationship between tilt coordinates and the heading of said mobile unit further comprises the step of:

determining the heading of said SATPS receiver by utilizing a compass.

19. A method for generating a map, said method comprising the steps of:

performing three dimensional coordinates measurements of a mobile unit by using a satellite positioning system (SATPS) receiver mounted in a housing means of said mobile unit;

performing tilt coordinates measurements of said mobile unit synchronously with said three dimensional coordinates measurements of said mobile unit by using a tilt angle measurement device integrated with said SATPS receiver;

calculating three dimensional coordinates of an implement mounted in said mobile unit by solving a set of geometrical equations including said three dimensional coordinates of said mobile unit, said tilt coordinates of said mobile unit, and a distance between said SATPS receiver and said implement by using a SATPS/tilt integrated navigational computer;

recording three dimensional coordinates of said implement by using a memory unit of said SATPS/tilt integrated navigational computer; and generating a map of an actual area covered by said implement by using a map generating software.

* * * * *